United States Patent
Matsuoka et al.

(10) Patent No.: US 8,243,814 B2
(45) Date of Patent: Aug. 14, 2012

(54) COMBING ARTIFACTS DETECTION APPARATUS AND COMBING ARTIFACTS DETECTION METHOD

(75) Inventors: Hideki Matsuoka, Kawasaki (JP); Takashi Hamano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 322 days.

(21) Appl. No.: 12/605,438

(22) Filed: Oct. 26, 2009

(65) Prior Publication Data

US 2010/0271487 A1  Oct. 28, 2010

(30) Foreign Application Priority Data

Oct. 27, 2008  (JP) .................................. 2008-275808

(51) Int. Cl.
*H04N 11/02* (2006.01)
(52) U.S. Cl. .................. 375/240.21; 348/448; 348/701; 375/240.26
(58) Field of Classification Search ........ 375/240.01–240.29; 348/448
See application file for complete search history.

(56) References Cited

U.S. PATENT DOCUMENTS

| | | |
|---|---|---|
| 2005/0259950 A1 | 11/2005 | Landsiedel et al. |
| 2007/0188662 A1* | 8/2007 | Winger et al. ................ 348/701 |
| 2007/0195202 A1* | 8/2007 | Chen et al. .................... 348/701 |
| 2007/0252915 A1 | 11/2007 | Matsuoka |
| 2008/0062307 A1* | 3/2008 | Zhai et al. .................... 348/448 |
| 2008/0062308 A1* | 3/2008 | Zhai et al. .................... 348/448 |
| 2008/0062310 A1 | 3/2008 | Sato |

FOREIGN PATENT DOCUMENTS

| | | |
|---|---|---|
| JP | 2004-201010 | 7/2004 |
| JP | 2005-223503 | 8/2005 |
| JP | 2005-318624 | 11/2005 |
| JP | 2006-123756 | 5/2006 |
| JP | 2007-019796 | 1/2007 |
| JP | 2007-300152 | 11/2007 |
| JP | 2008-099231 | 4/2008 |

* cited by examiner

*Primary Examiner* — Joseph Ustaris
*Assistant Examiner* — Hang Gao
(74) *Attorney, Agent, or Firm* — Fujitsu Patent Center

(57) ABSTRACT

A combing artifacts detection apparatus includes a feature-value calculating unit that calculates a feature value from an input image; a film-mode detecting unit that detects a film mode by using the feature value; and a pixel-difference calculating unit that calculates a pixel difference between fields by using 2:3 pulldown sequence detection information and input-image combination information that are results of the film mode detection. The apparatus also includes a luminance-variation determining unit that determines luminance variation based on a calculation result of the pixel-difference calculating unit; a combing artifacts-candidate detecting unit that detects a combing artifacts candidate per line based on a determination result of the luminance-variation determining unit; and a combing artifacts determining unit that determines whether a combing artifacts occurs for each image based on a detection result of the combing artifacts-candidate detecting unit.

5 Claims, 6 Drawing Sheets

COMBING ARTIFACTS DETECTION APPARATUS AND COMBING ARTIFACTS DETECTION METHOD

CROSS-REFERENCE TO RELATED APPLICATION(S)

This application is based upon and claims the benefit of priority of the prior Japanese Patent Application No. 2008-275808, filed on Oct. 27, 2008, the entire contents of which are incorporated herein by reference.

FIELD

The embodiments discussed herein are directed to a combing artifacts detection apparatus and a combing artifacts detection method.

BACKGROUND

When a cinema video is displayed on a television that complies with the National Television System Committee (NTSC) standards (e.g., in Japan and the USA) or when a cinema video recorded on a digital versatile disc (DVD) is displayed using an NTSC signal on a television, a 24-frame progressive video, i.e., a cinema video, is converted into a 60-field interlaced video, i.e., a telecine video.

This type of conversion is called the 2:3 pulldown process, in which a field before two fields is repeated once in a 5-field cycle (hereinafter, "repeat field"). Specifically, the same field is repeated once in the 5-field cycle, so that a video with a frame frequency 5/4 times as high as before is produced.

The telecine video is designed to be displayed on an interlaced display such as a cathode ray tube (CRT); therefore, when the telecine video is displayed on a 60-field interlaced display, the video is directly output thereto. However, in recent years, video is often displayed on a progressive display, such as a liquid crystal display television and a plasma television. To display the interlaced video on the progressive display, the interlaced video is subjected to deinterlace so that it is displayed as a progressive video.

Examples of deinterlace include a method of obtaining a single frame by combining the top field and the bottom field of interlace video. When the interlaced video to be converted is a telecine video that is obtained by the 2:3 pulldown process, in other words, when 60-frame interlaced video which is produced from 24-frame progressive video is converted into a 60-frame progressive video, it is preferable to combine the top field and the bottom field that are produced from a single frame of the 24-frame progressive video.

A typical conventional method is so-called film mode detection that detects whether the interlace video is a telecine video. A known method of performing film mode detection, i.e., 2:3 pulldown sequence detection, from the interlaced scanning video is a technique in which the sum of absolute differences between frames (a feature value) with respect to the image of the current field and the image of the second field prior to the current field is calculated in pixel units, and film detection/non-detection is performed by using a characteristic in which the field having high correlation is repeated once in the 5-field cycle (see, for example, Japanese Laid-open Patent Publication No. 2007-300152). Because the repeat field is detected in this way, the top field and the bottom field can be properly combined using the deinterlace.

In typical processing for deinterlace, when a film mode is detected and when the timing of the occurrence of the repeat field is determined, the deinterlace is performed, while maintaining the film mode, assuming that the repeat field is cyclically repeated. However, for example, in a process of producing a commercial video for publicity, although the commercial video is produced preferably by editing the cinema video and then converting the edited cinema video to the telecine video, most commercial videos are produced by editing the telecine video. Therefore, the 5-field cycle becomes irregular in some parts.

Because the 5-field cycle is occasionally disrupted in the edited interlaced cinema video, when detecting the film mode using the above-described method and performing the deinterlace by combining the fields based on a detection result, video images located on both sides of an editing point are combined in some cases. When the video images located on both sides of the editing point are combined in this way, the 60-progressive frame is produced by combining the top field and the bottom field obtained from different fields of the telecine video, which causes combing artifacts.

SUMMARY

According to an aspect of the present invention, a combing artifacts detection apparatus includes a feature-value calculating unit that calculates a feature value from an input image; a film-mode detecting unit that detects a film mode by using the feature value; a pixel-difference calculating unit that calculates a pixel difference between fields by using 2:3 pulldown sequence detection information and input-image combination information that are results of the film mode detection; a luminance-variation determining unit that determines luminance variation based on a calculation result of the pixel-difference calculating unit; a combing artifacts-candidate detecting unit that detects a combing artifacts candidate per line based on a determination result of the luminance-variation determining unit; and a combing artifacts determining unit that determines whether a combing artifacts occurs for each image based on a detection result of the combing artifacts-candidate detecting unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings.

Figure 1:
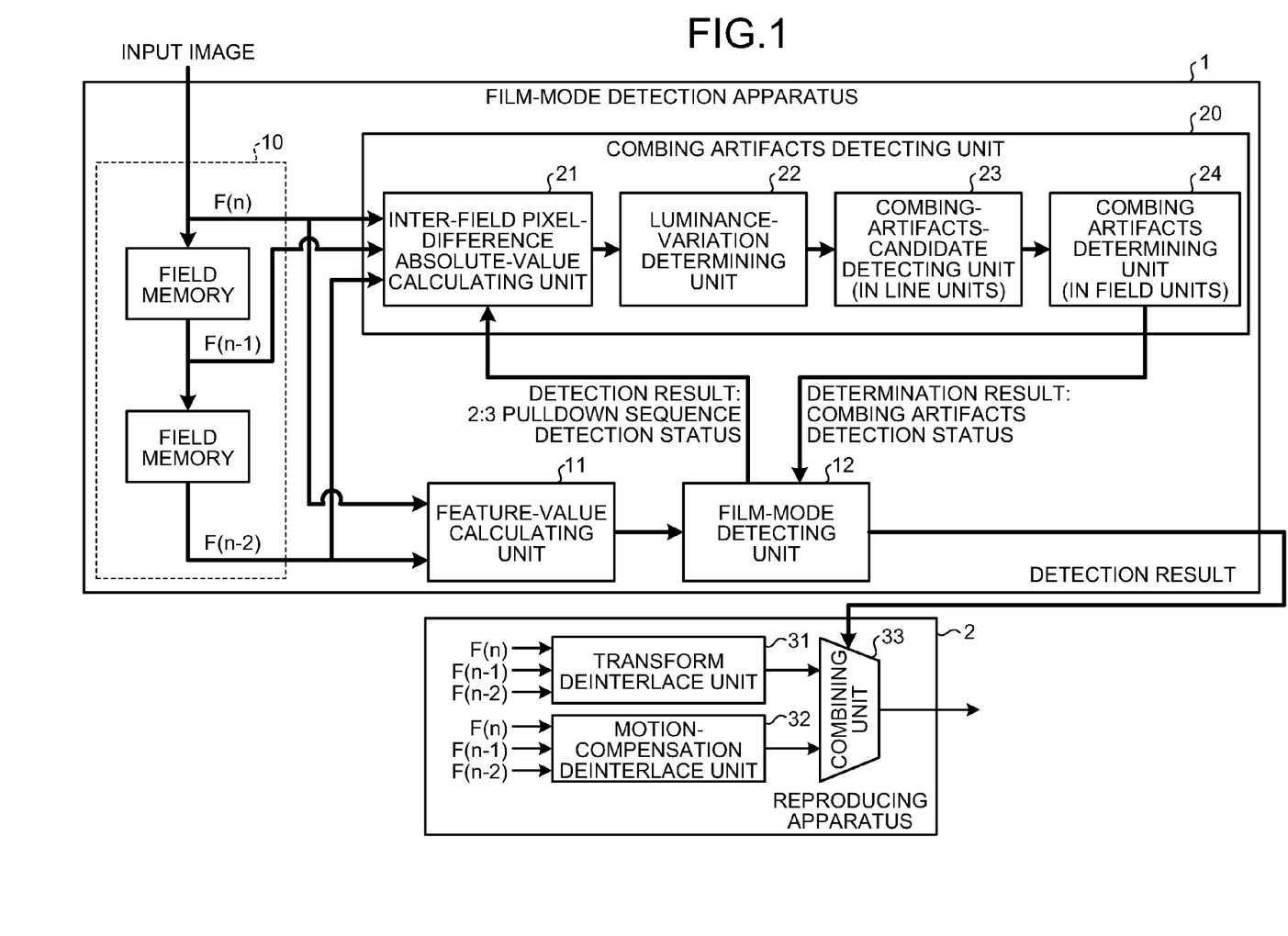
FIG. 1 is a block diagram explaining the configuration of a film-mode detection apparatus according to an embodiment of the present invention.

FIG. 1 is a block diagram explaining the configuration of a film-mode detection apparatus 1 according to an embodiment of the present invention. As illustrated in FIG. 1, the film-mode detection apparatus 1 includes a field memory 10, a feature-value calculating unit 11, a film-mode detecting unit 12, and a combing artifacts detecting unit 20.

The field memory 10 stores therein at least two fields of an input image. The feature-value calculating unit 11 reads out a video image F(n) of the current field and the second video image F(n−2) prior to the current field and calculates, in pixel units, an absolute difference between frames, i.e., a feature value.

The feature value calculated by the feature-value calculating unit 11 shows that a field indicating high correlation appears once in a 5-field cycle. By using this characteristic, the film-mode detecting unit 12 performs film detection/non-detection and outputs a detection result to a reproducing apparatus 2.

Figure 2:
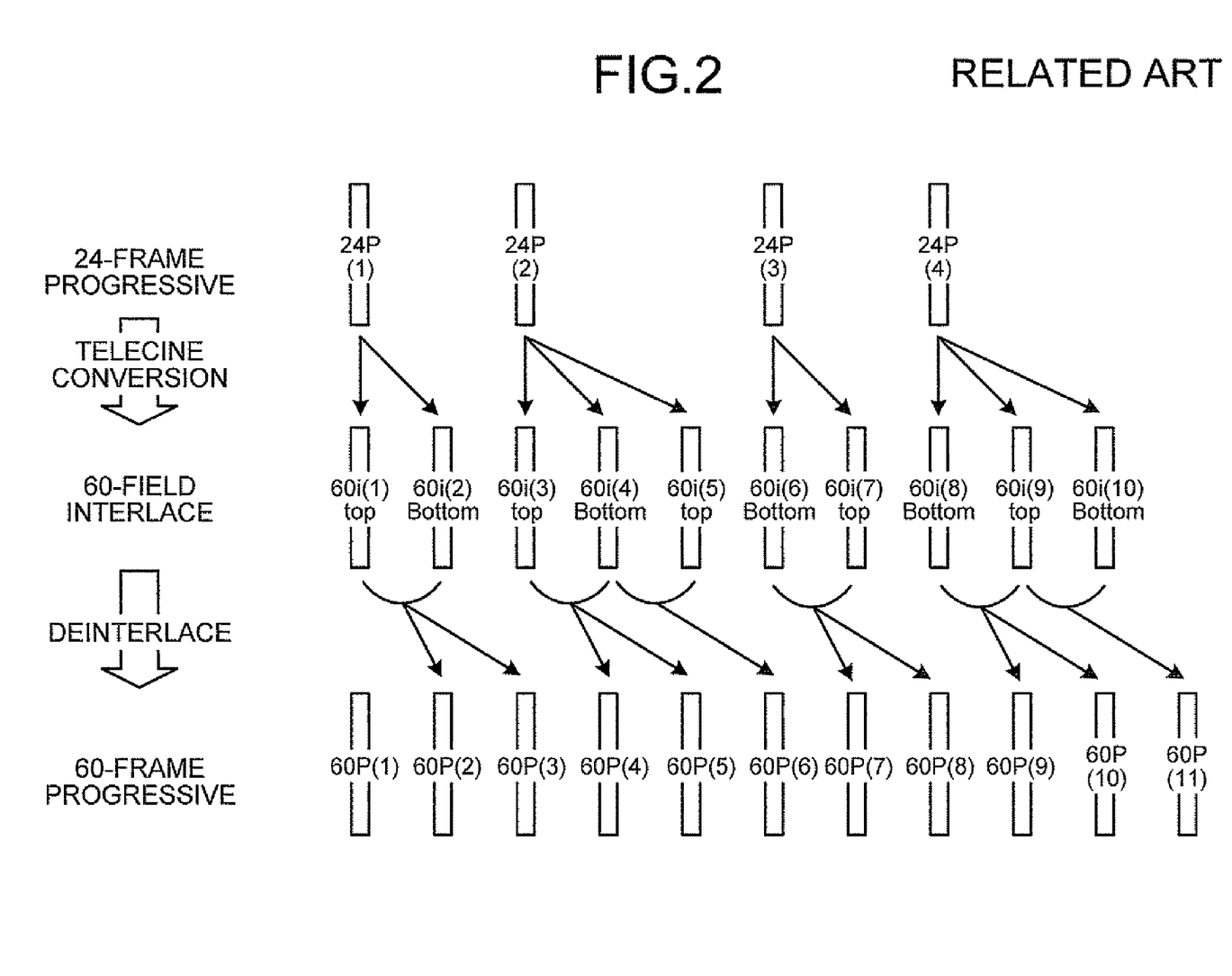
FIG. 2 is a block diagram explaining video image conversion.

Video image conversion is described with reference to FIG. 2. As illustrated in FIG. 2, with 2:3 pulldown processing, i.e., telecine conversion, in which the 24-frame progressive video (cinema video) is converted into a 60-field interlaced video, a frame 24P(1) corresponding to the first frame of the 24-frame progressive video produces fields 60i(1) and 60i(2) that correspond to the first field and the second field of the 60-field interlaced video, respectively.

A frame 24P(2) corresponding to the second frame of the 24-frame progressive video produces fields 60i(3), 60i(4), and 60i(5) that correspond to the third field, the fourth field, and the fifth field of the 60-field interlaced video, respectively.

In the 60-field interlaced video, the fields 60i(1), 60i(3), and 60i(5) are top fields, whereas, the fields 60i(2) and 60i(4) are bottom fields. Specifically, the fields 60i(3) and 60i(5) of the 60-field interlaced video are the top fields produced from the frame 24P(2), and the field 60i(5) of the 60-field interlaced video is a repeat field of the field 60i(3).

When detecting the repeat field, the film-mode detecting unit 12 sends the detection result indicating that "a film mode is detected", together with information indicating which field corresponds to the repeat field to the reproducing apparatus 2 that processes deinterlace.

As illustrated in FIG. 1, the reproducing apparatus 2 includes a transform deinterlace unit 31, a motion-compensation deinterlace unit 32, and a combining unit 33. The transform deinterlace unit 31 is a processing unit that converts the interlaced video to the progressive video by combining the top field with the bottom field of the interlaced video. The motion-compensation deinterlace unit 32 is a processing unit that converts the interlaced video to the progressive video by detecting a movement between fields in the interlaced video and performing interpolation. The combining unit 33 sets one of the results of deinterlace, which is obtained from the transform deinterlace unit 31 and the motion-compensation deinterlace unit 32, to be effective. Specifically, when the combining unit 33 receives the detection result of the film-mode detecting unit 12 indicating a film mode status, the combining unit 33 switches an output from the transform deinterlace unit 31 to be effective.

As illustrated in FIG. 2, with the transform deinterlace, the top field 60i(1), which is produced from the frame 24P(1) in the telecine conversion, is combined with the bottom field 60i(2), which is produced from the 24P(1) in telecine conversion, and the second frame 60P(2) and the third frame 60P(3) of the 60-frame progressive video are produced. The first frame 60P(1) of the 60-frame progressive video is produced by using a field that has been produced in a similar manner as in the above-described transform deinterlace.

By combining the top field with the bottom field that are originated from the identical frame of the 24-frame progressive video in this way, the obtained frames 60P(2) and 60P(3) are high-quality images without combing artifacts.

In a similar manner, by combining the top field 60i(3), which is produced from 24P(2) in the telecine conversion, with the bottom field 60i(4), which is produced from the frame 24P(2) in the telecine conversion, the fourth frame 60P(4) and the fifth frame 60P(5) of the 60-frame progressive video are produced.

In addition, the field 60i(5) corresponding to the repeat field is produced from the frame 24P(2). Accordingly, the sixth frame 60P(6) of the 60-frame progressive video is produced by combining a bottom field 60i (4) with a top field 60i(5).

By repeating the above-described processing, so long as the repeat field is correctly sequenced, a combination of the top field and the bottom field, which are originated from the identical frame and subjected to telecine conversion from the 24-frame progressive video, can be properly performed.

Figure 3:
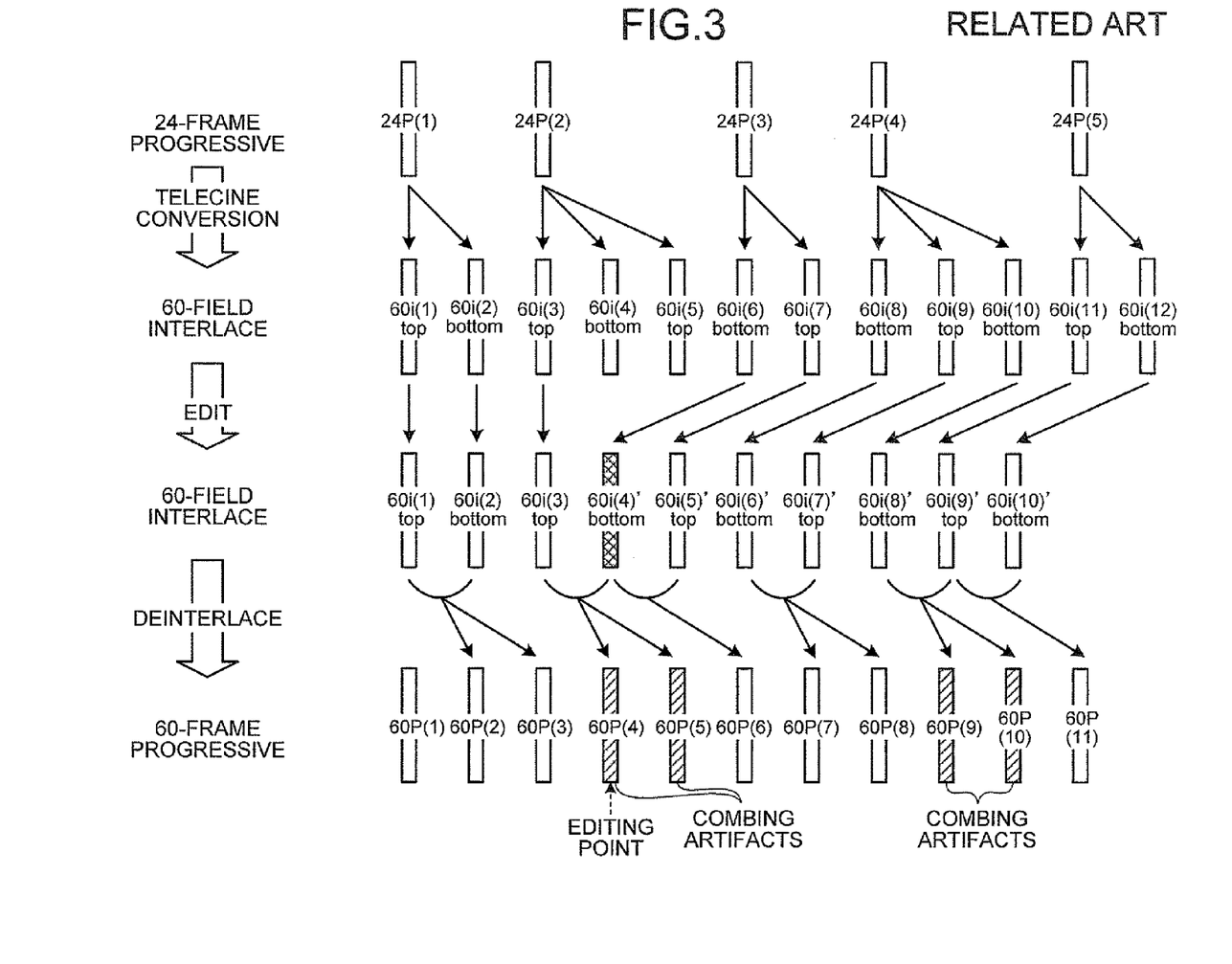
FIG. 3 is a block diagram explaining an editing point and the occurrence of combing artifacts.

However, as illustrated in FIG. 3, when the 60-field interlaced video is edited, a timing shift occurs in the repeat field. When the timing shift remains as it is, fields that are not to be combined in the deinterlace are incorrectly combined, i.e., a top field and a bottom field, which are subjected to the telecine conversion from the 24-frame progressive video, are incorrectly combined. As a result, the combing artifacts occurs.

With the example illustrated in FIG. 3, in the telecine conversion, the fourth field 60i(4) and the fifth field 60i(5) of the 60-field interlace image are deleted by editing. With this editing process, fields from 60i(6) to 60i(12), which have not been edited, are converted into fields from 60i(4)' to 60i(10)' which have been edited.

With the example illustrated in FIG. 3, the field 60i(4)' corresponds to the editing point. When performing the deinterlace in this state, the frames 60P(4) and 60P(5) of the 60-frame progressive video are respectively combined with the top field produced from the second field 24P(2) of the 24-frame progressive video and the bottom field produced from the third field 24P(3) of the 24-frame progressive video, which causes the combing artifacts in the image.

Because this type of shift cyclically occurs, the combing artifacts cyclically occurs in the subsequent frames 60P(9) and 60P(10) of the 60-frame progressive video.

Accordingly, with the film-mode detection apparatus 1 according to the embodiment, combing artifacts detection is performed in such a manner that the combing artifacts detecting unit 20 outputs combination information of the fields and a detection status of the 2:3 pulldown sequence that are obtained as the detection result of the film-mode detecting unit 12.

The combing artifacts detecting unit 20 includes an inter-field pixel-difference absolute-value calculating unit 21, a luminance-variation determining unit 22, a combing artifacts-candidate detecting unit 23, and a combing artifacts determining unit 24.

Figure 4:
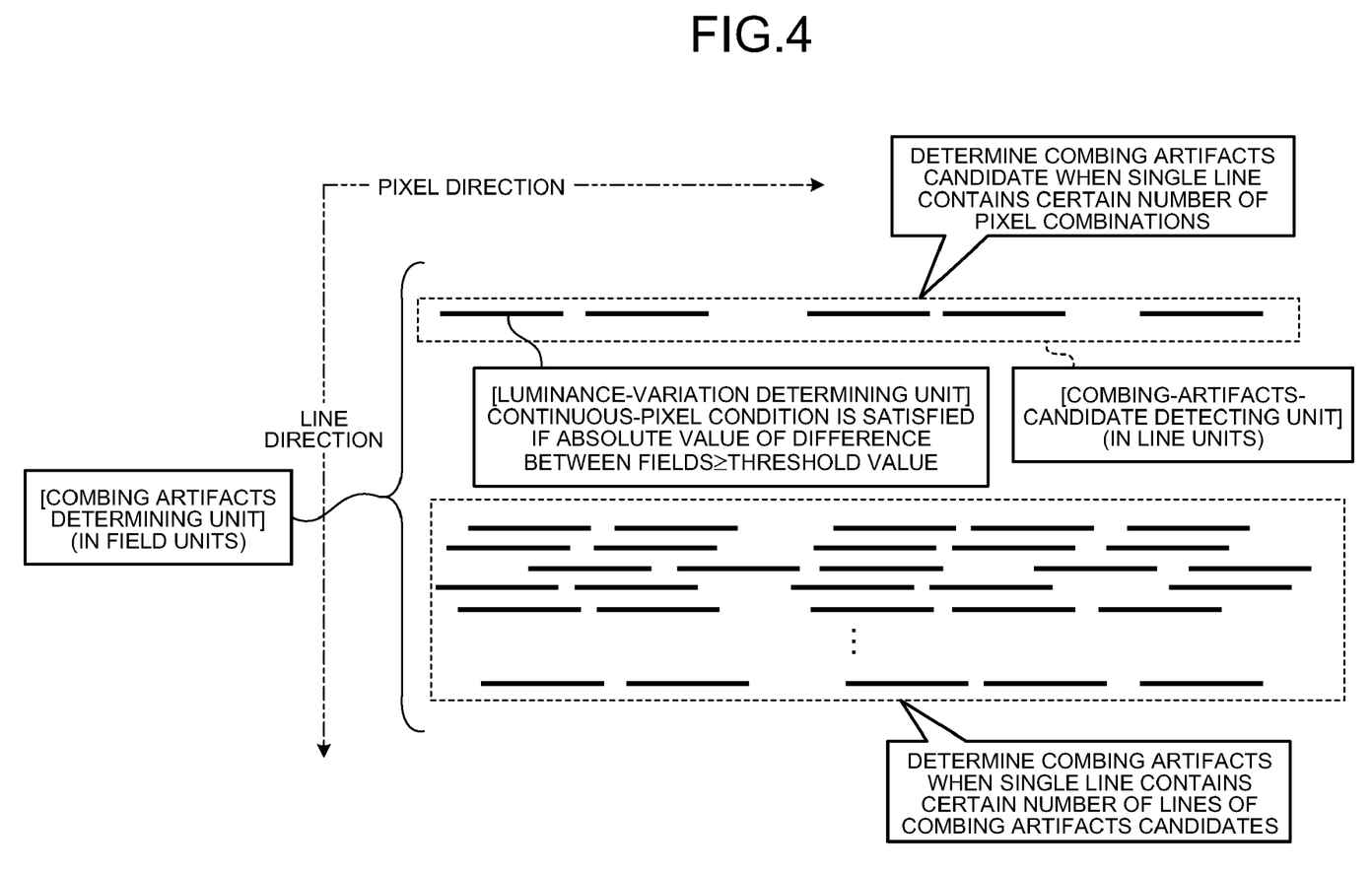
FIG. 4 is a block diagram explaining a method of detecting the combing artifacts.

Processing performed by the combing artifacts detecting unit 20 is described with reference to FIGS. 4 and 5. FIG. 4 is a block diagram explaining the method of detecting the combing artifacts.

In the combing artifacts detecting unit 20, the inter-field pixel-difference absolute-value calculating unit 21 calculates an absolute difference between fields with respect to two fields to be combined, which is obtained from the combination information based on a film mode detection result.

The luminance-variation determining unit 22 extracts a pixel combination containing Nx or more pixels that are continuously aligned, in which the pixels have a luminance value, i.e., the absolute difference between fields, that exceeds a threshold value.

When a line includes Mx or more pixel combinations containing Nx or more pixels that are continuously aligned as determined by the luminance-variation determining unit 22, the combing artifacts-candidate detecting unit 23 determines the line is a combing artifacts candidate and sets a combing artifacts-candidate flag for the line.

When Ny or more lines of the combing artifacts candidates are continuously aligned, the combing artifacts determining unit 24 determines that two fields to be subsequently combined have the combing artifacts.

When the combing artifacts detecting unit 20 determines that the combing artifacts occurs, the film-mode detecting unit 12 switches the detection state of the 2:3 pulldown sequence to the non-detection state so that the film mode detection cannot be performed.

Figure 5:
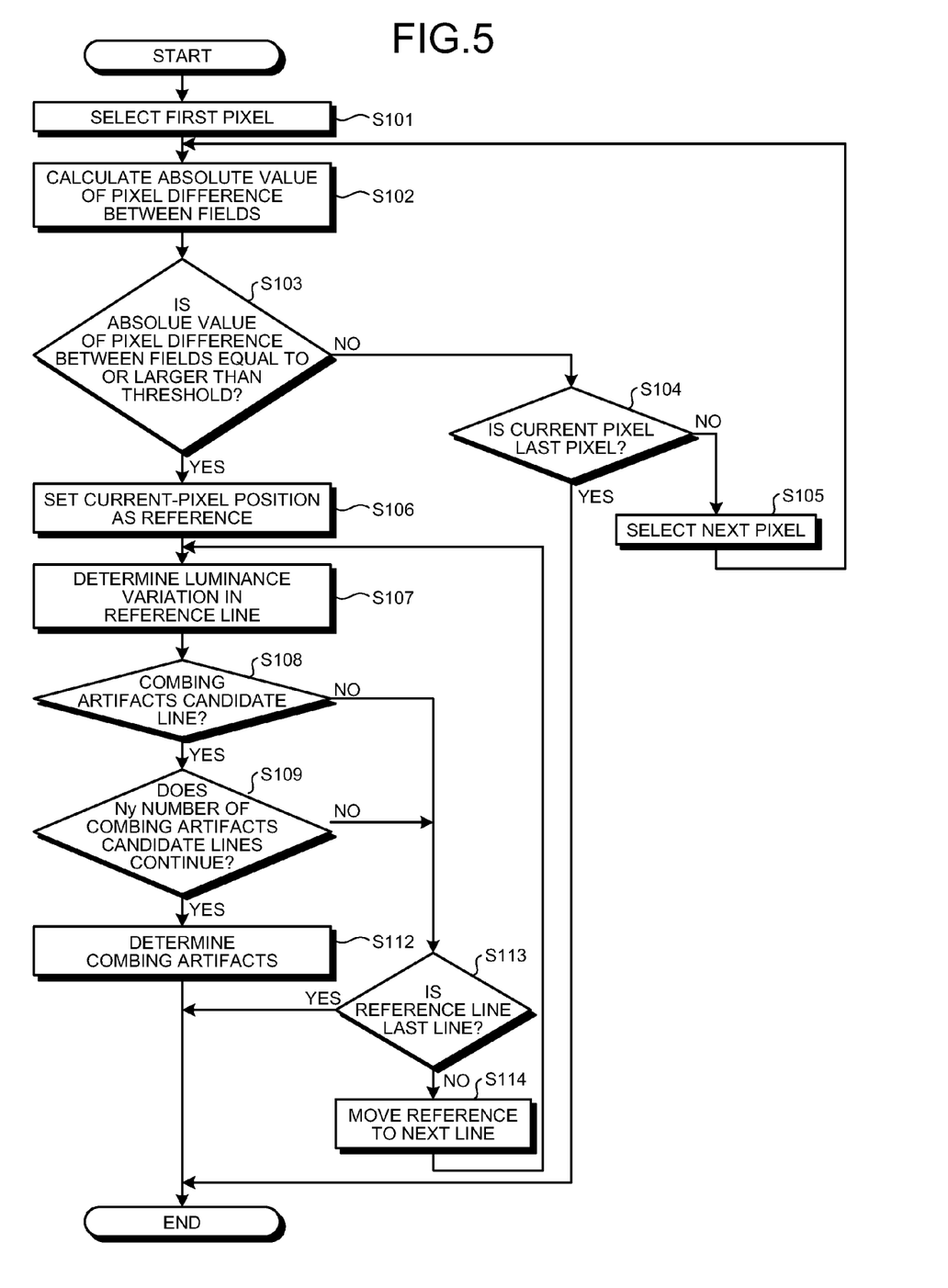
FIG. 5 is a flow chart explaining a process of detecting the combing artifacts.

FIG. 5 is a flow chart explaining the operation of the combing artifacts detecting unit 20. The combing artifacts detecting unit 20 selects a first pixel in the field as a pixel to be processed (Step S101).

The inter-field pixel-difference absolute-value calculating unit 21 calculates a pixel absolute difference between fields with respect to the pixel to be processed (Step S102). When the calculated pixel absolute difference between fields is less than the threshold value (No at Step S103), the inter-field pixel-difference absolute-value calculating unit 21 determines whether the current pixel is the last pixel in an image (Step S104). If the pixel is not the last pixel (No at Step S104), the inter-field pixel-difference absolute-value calculating unit 21 selects the next pixel (Step S105), and the process control returns to Step S102. When a process for the last pixel ends without detecting pixels in which the pixel absolute difference is equal to the threshold value or more (Yes at Step S104), the process control goes to end.

When the calculated pixel absolute difference between fields for the selected pixel is equal to or more than the threshold value (Yes at Step S103), the luminance-variation determining unit 22 sets a position of the current pixel as a reference (Step S106) and determines luminance variation in a reference line, i.e., a line running in the pixel direction illustrated in FIG. 4 (X direction) from the reference (Step S107).

By using the determination result of the luminance variation, the combing artifacts-candidate detecting unit 23 determines whether the reference line is a line of the combing artifacts candidate (Step S108). Specifically, if the reference line includes Nx or more continuous pixels in which the pixel absolute difference is equal to the threshold value or more and the combing artifacts-candidate detecting unit 23 determines that the line having Mx or more pixel combinations, in which Nx or more pixels that are continuously aligned, is the combing-artifacts-candidate line.

When the reference line is the combing-artifacts-candidate line (Yes at Step S108), the combing artifacts determining unit 24 determines whether Ny number of the combing-artifacts-candidate lines continue (Step S109). When Ny number of the combing-artifacts-candidate lines continue (Yes at Step S109), the combing artifacts determining unit 24 determines that the combing-artifacts-candidate lines are the combing artifacts, and the process control goes to end (Step S112).

On the other hand, when the reference line is not the combing-artifacts-candidate line (No at Step S108), and when Ny or less combing-artifacts-candidates lines continue (No at Step S109), the combing artifacts determining unit 24 determines whether the current reference line is the last line of the field (Step S113). When the current reference line is not the last line of the field, the combing artifacts determining unit 24 moves the reference to the first pixel of the next line (Step S114), and the process control returns to Step S107. When the current reference line is the last line (Yes at Step S113), the process control goes to end without indicating the combing artifacts.

The combing artifacts detecting unit 20 determines the luminance variation (luminance) by extracting the absolute difference between fields in pixel units, based on the film mode detection result (the detection status of the 2:3 pulldown sequence and the combining information), and detects the combing artifacts when there is a predetermined combination or more of the luminance variations (luminances).

By using the combing artifacts detection result, i.e., the status of the combing artifacts, the film-mode detecting unit 12 switches the detection status of the 2:3 pulldown sequence from the detection status to the non-detection status.

With a conventional film mode detection technology, even when there is a cinema video that is edited using the current field, a combination of the video images is performed based on the film mode detection result (the detection status of the 2:3 pulldown sequence and the combination information of the video images), which is obtained immediately before the editing. Accordingly, when the video is output using the current field, the combing artifacts occurs, which causes a problem in the conventional technology. In contrast, with the configuration of the combing artifacts detecting unit 20, such a problem has been solved and detection performance of the editing point of the edited cinema image can be improved. Accordingly, it is possible to produce high-quality images by implementing a prompt release from the film mode and correct image combination.

The configuration and the operation described in the embodiment is just an example. The present invention is not limited to the above-described configuration and the operation. The embodiment has been described by way of an example configuration in which the detection result of the combing artifacts returns to the film-mode detecting unit 12. However, instead of this configuration, the detection result of the combing artifacts can be output to an external unit, and the external unit operates in response to detection results of the film-mode and the combing artifacts.

Figure 6:
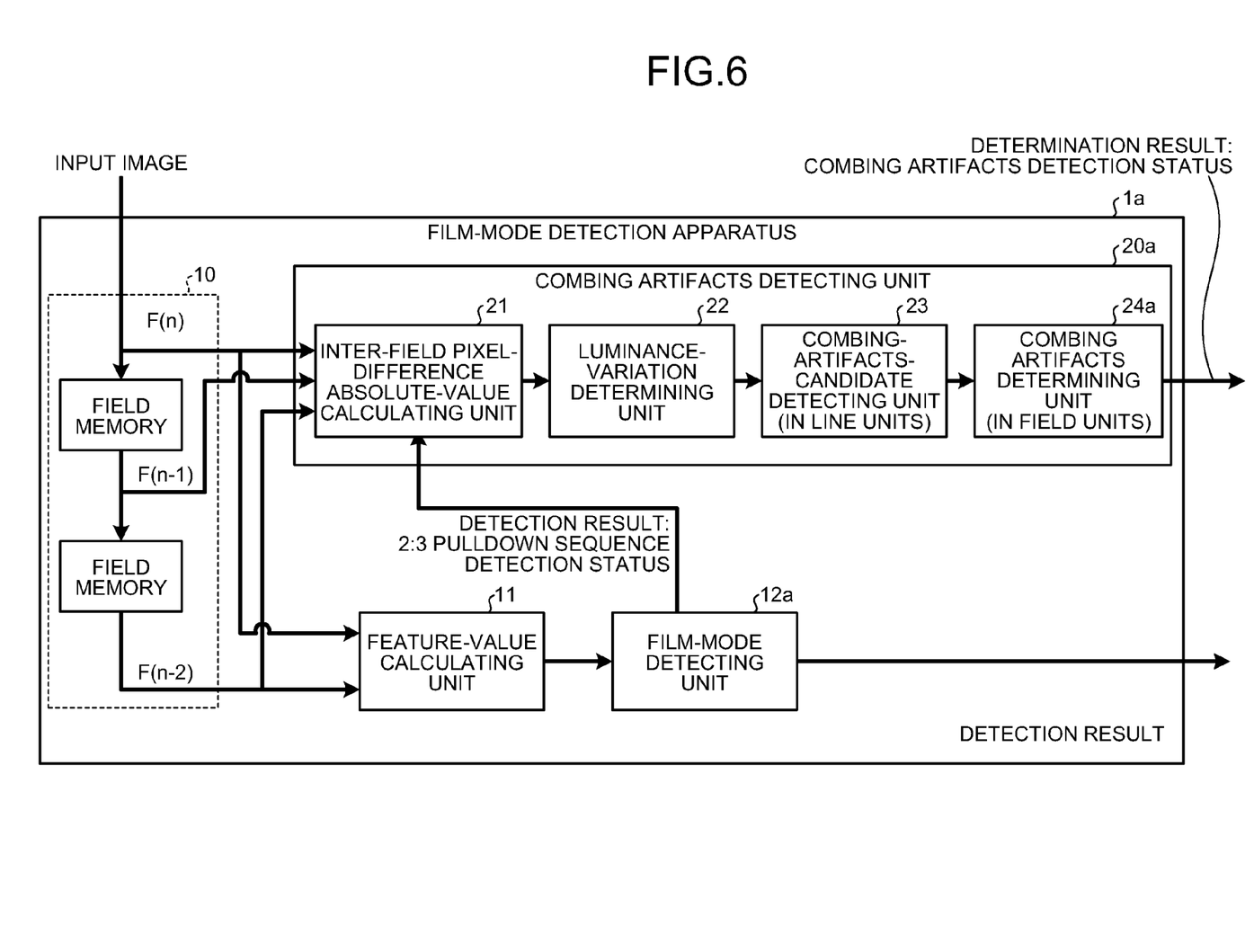
FIG. 6 is a block diagram explaining a film-mode detection apparatus according to a modification of the embodiment.

A specific example of a modification of the embodiment is illustrated in FIG. 6. With a film-mode detection apparatus 1a illustrated in FIG. 6, a combing artifacts detecting unit 20a outputs a determination result of a combing artifacts determining unit 24a to the external unit, and a film-mode detecting unit 12a detects the field mode without using the combing artifacts detection result and outputs the detection result to the external unit. Because other configurations and operations are the same as those in the film-mode detection apparatus 1 illustrated in FIG. 1, components that are identical to those used in the film-mode detection apparatus 1 are assigned the same reference numerals, and description thereof is omitted here.

In the embodiments, the combing artifacts detecting unit 20 is included in the film-mode detection apparatus 1. However, the configuration is not limited thereto. For example, a combing artifacts detection apparatus can be configured as an independent unit.

According to an aspect of an embodiment, with a film-mode detection apparatus, combing artifacts detection method, and a film-mode detection apparatus, detection performance of an editing point of an edited cinema video can be improved by detecting combing artifacts with high accuracy. Accordingly, it is possible to produce high-quality images by implementing a prompt release from a film mode and correct image combination.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A combing artifacts detection apparatus comprising:
    a feature-value calculating unit that calculates a feature value from an input image;
    a film-mode detecting unit that detects a film mode by using the feature value to obtain 2:3 pulldown sequence detection information and combination information of the input image;
    a pixel-difference calculating unit that calculates a pixel difference between fields and calculates, in pixel units, an absolute difference in luminance between relevant input images by using the 2:3 pulldown sequence detection information and the combination information;
    a luminance-variation determining unit that determines luminance variation based on a calculation result of the pixel-difference calculating unit;
    a combing artifacts-candidate detecting unit that detects continuous pixels, for which the absolute difference in luminance calculated by the pixel-difference calculating unit is equal to or larger than a first threshold, as a combing artifacts candidate per line based on a determination result of the luminance-variation determining unit, a number of pixels in the continuous pixels being equal to or larger than a second threshold, the combing artifacts-candidate detecting unit further detecting a line having the continuous pixels of a number equal to or larger than a third threshold as a combing-artifacts-candidate line; and
    a combing artifacts determining unit that determines that a combing artifacts occurs in the input image when the combing-artifacts-candidate lines detected by the combing artifacts-candidate detecting unit continue by a number equal to or larger than a fourth threshold.

2. The combing artifacts detection apparatus according to claim 1, wherein the film-mode detecting unit detects the film mode by using a determination result of the combing artifacts.

3. A method of detecting combing artifacts, the method comprising:
    calculating a pixel difference between relevant input images and calculates, in pixel units, an absolute difference in luminance between relevant input images by using 2:3 pulldown sequence detection information on continuous input images and combination information on the continuous input images;
    detecting continuous pixels, for which the absolute difference in luminance calculated in the calculating is equal to or larger than a first threshold, as a combing artifacts candidate for each line of the input image based on a result of the calculating, a number of pixels in the continuous pixels being equal to or larger than a second threshold, and further detecting a line having the continuous pixels of a number equal to or larger than a third threshold as a combing-artifacts-candidate line; and
    determining that a combing artifacts occurs in the input image when the combing-artifacts-candidate lines detected in the detecting continue by a number equal to or larger than a fourth threshold.

4. A film-mode detection apparatus comprising:
    a feature-value calculating unit that calculates a feature value from an input image;
    a film-mode detecting unit that detects a film mode by using the feature value to obtain 2:3 pulldown sequence detection information and combination information of the input image;
    a pixel-difference calculating unit that calculates a pixel difference between fields and calculates, in pixel units, an absolute difference in luminance between relevant input images by using the 2:3 pulldown sequence detection information and the combination information;
    a luminance-variation determining unit that determines luminance variation based on a calculation result of the pixel-difference calculating unit;
    a combing artifacts-candidate detecting unit that detects continuous pixels, for which the absolute difference in luminance calculated by the pixel-difference calculating unit is equal to or larger than a first threshold, as a combing artifacts candidate per line based on a determination result of the luminance-variation determining unit, a number of pixels in the continuous pixels being equal to or larger than a second threshold, the combing artifacts-candidate detecting unit further detecting a line having the continuous pixels of a number equal to or larger than a third threshold as a combing-artifacts-candidate line; and
    a combing artifacts determining unit that determines that a combing artifacts occurs in the input image when the combing-artifacts-candidate lines detected by the combing artifacts-candidate detecting unit continue by a number equal to or larger than a fourth threshold.

5. The film-mode detection apparatus according to claim 4, wherein the film-mode detecting unit detects the film mode by using a determination result of the combing artifacts.

* * * * *